(12) United States Patent
Perdue et al.

(10) Patent No.: US 12,709,486 B2
(45) Date of Patent: Aug. 18, 2026

(54) CONVEYOR BELT CLEAN-OUT ROLLER SYSTEMS AND METHODS

(71) Applicant: Cambridge International, Inc., Cambridge, MD (US)

(72) Inventors: Thomas O. Perdue, Salisbury, MD (US); George H. Messick, Jr., Cambridge, MD (US)

(73) Assignee: CAMBRIDGE INTERNATIONAL, INC., Cambridge, MD (US)

( * ) Notice: Subject to any disclaimer, the term of this patent is extended or adjusted under 35 U.S.C. 154(b) by 46 days.

(21) Appl. No.: 18/901,861

(22) Filed: Sep. 30, 2024

(65) Prior Publication Data

US 2025/0108977 A1 Apr. 3, 2025

Related U.S. Application Data

(60) Provisional application No. 63/541,684, filed on Sep. 29, 2023.

(51) Int. Cl.

*B65G 39/073* (2006.01)
*B65G 45/14* (2006.01)
*B65G 45/18* (2006.01)

(52) U.S. Cl.

CPC ........... *B65G 39/073* (2013.01); *B65G 45/18* (2013.01); *B65G 45/14* (2013.01)

(58) Field of Classification Search

CPC ....... B65G 39/073; B65G 45/14; B65G 45/18
USPC .................................................. 198/494, 498
See application file for complete search history.

(56) References Cited

U.S. PATENT DOCUMENTS 2,647,619 A 8/1953 Green
2,940,586 A * 6/1960 Vamvakas .............. B65G 23/06 198/496
3,046,805 A 7/1962 Gorp
3,055,229 A 9/1962 Mecham
3,220,272 A 11/1965 Beausoleil
3,363,476 A 1/1968 Brown
3,631,980 A * 1/1972 Hamachek, III ....... A01D 45/24 209/384
3,812,562 A 5/1974 Lovett
(Continued)

FOREIGN PATENT DOCUMENTS

EP 3702300 A1 9/2020
KR 20160014398 A * 2/2016 ............. B65G 45/18

OTHER PUBLICATIONS

Regal Rexnord Corporation, KleanTop® PacTitan® Pro Conveyor Belt Installation and Maintenance Manual, Form #FT3-007E, Revised May 2023, 8 pages.

(Continued)

*Primary Examiner* — James R Bidwell
(74) *Attorney, Agent, or Firm* — Armstrong Teasdale LLP

(57) ABSTRACT

A clean-out roller that interfaces with a conveyor belt is provided. The roller includes a first sprocket adjacent a first end, a second sprocket adjacent a second end, and a plurality of paddles arranged widthwise from the first end to the second end. The plurality of paddles are coupled to the first sprocket and the second sprocket and located circumferentially around the sprockets in an unequal spacing pattern about the sprockets. A paddle of the plurality of paddles including a tip edge extending radially outward to extend into openings of the conveyor belt.

18 Claims, 6 Drawing Sheets

(56) References Cited

U.S. PATENT DOCUMENTS

| | | | | |
|---|---|---|---|---|
| 3,995,487 | A | 12/1976 | Locke | |
| 4,194,260 | A | 3/1980 | Culp | |
| D286,932 | S | 11/1986 | Bode et al. | |
| 4,956,914 | A | 9/1990 | Valster et al. | |
| 4,984,363 | A | 1/1991 | Valster et al. | |
| 5,083,659 | A | 1/1992 | Bode et al. | |
| 5,109,976 | A * | 5/1992 | Mohri | A47L 11/24 198/414 |
| 5,160,020 | A | 11/1992 | Thomas, Sr. | |
| 5,161,666 | A * | 11/1992 | Pope | B65G 45/20 198/496 |
| 5,282,532 | A | 2/1994 | Thomas, Sr. | |
| 5,449,063 | A | 9/1995 | Thomas, Sr. | |
| 5,816,988 | A | 10/1998 | Daringer et al. | |
| 6,041,916 | A | 3/2000 | Daringer et al. | |
| D443,627 | S | 6/2001 | West | |
| 6,935,488 | B2 | 8/2005 | Dow et al. | |
| 7,070,042 | B2 | 7/2006 | Dow et al. | |
| 7,527,142 | B1 | 5/2009 | Zeltwanger et al. | |
| 7,565,967 | B2 * | 7/2009 | Maine, Jr. | B65G 23/06 198/848 |
| 7,975,840 | B2 | 7/2011 | Messick, Jr. et al. | |
| 8,240,460 | B1 * | 8/2012 | Bleau | B65G 45/14 198/496 |
| 8,424,676 | B2 | 4/2013 | Jones et al. | |
| 8,739,965 | B2 | 6/2014 | Laughlin | |
| RE45,145 | E | 9/2014 | Zeltwanger et al. | |
| 8,857,606 | B2 | 10/2014 | Kowalski et al. | |
| 9,050,552 | B2 | 6/2015 | Keeling et al. | |
| 9,284,125 | B2 | 3/2016 | Laughlin | |
| 9,475,642 | B2 | 10/2016 | Messick, Jr. | |
| 9,555,970 | B2 | 1/2017 | Franzoni et al. | |
| 10,442,631 | B2 | 10/2019 | Kowalski et al. | |
| RE48,600 | E | 6/2021 | Zeltwanger et al. | |
| 11,142,404 | B2 | 10/2021 | Kowalski | |
| 11,634,284 | B1 * | 4/2023 | Reyes | B65G 45/14 198/496 |
| 2006/0163039 | A1 | 7/2006 | Marshall et al. | |

OTHER PUBLICATIONS

Regal Rexnord Corporation, Rexnord® KleanTop® PacTitan® Pro: A Hygienic, Food-Safe Conveying Solution, Form #FT1-010E, Copyright 2020, 2022 Regal Rexnord Corporation, 8 pages.

* cited by examiner 62
64
58
52
64
82
56
58
54
54
56
90
68
58
64
52
58
52
64
58
88
82
56
50
58
90
86
82
56
80
84
58
82
52
58
64
64
68
60

CONVEYOR BELT CLEAN-OUT ROLLER SYSTEMS AND METHODS

CROSS-REFERENCE TO RELATED APPLICATIONS

This application claims priority under 35 U.S.C. § 119 to U.S. Provisional Patent Application No. 63/541,684 filed on Sep. 29, 2023, the entire contents of which is incorporated herein by reference.

BACKGROUND

The present disclosure is directed to conveyor belt rollers and, more specifically, a conveyor belt clean-out roller that engages with openings of a conveyor belt to help clear materials from the openings of the conveyor belt without the roller itself becoming clogged with such materials.

FIG. 1 illustrates an example conveyor belt that can be used in, for example, food processing applications. In certain food processing applications, such as those involving breading or battering, openings in the belt may become packed with breading or battering materials. To address this issue, clean-out rollers have been developed to dislodge the material buildup from the belt as the belt rolls over the clean-out roller. Such current solutions, however, have limitations that prevent them from being an affordable, cost-efficient, customizable, and/or usable long-term.

SUMMARY

Some embodiments provide a roller that interfaces with a conveyor belt. The roller includes a first sprocket adjacent a first end, a second sprocket adjacent a second end, and a plurality of paddles arranged widthwise from the first end to the second end. The plurality of paddles are coupled to the first sprocket and the second sprocket and located circumferentially around the sprockets in an unequal spacing pattern about the sprockets. A paddle of the plurality of paddles includes a tip edge extending radially outward to extend into openings of the conveyor belt.

Some embodiments provide a roller that includes a first end, a second end, and a sprocket between the first end and the second end. The roller also includes a plurality of paddles arranged widthwise from the first end to the second end. The plurality of paddles are coupled to the sprocket and located circumferentially around the sprocket. Also, a paddle of the plurality of paddles includes a tip edge extending radially outward to extend into openings of the conveyor belt. The tip edge includes a first tip edge and a second tip edge arranged axially adjacent one another and circumferentially offset from one another.

Some embodiments provide a roller that includes a first end, a second end, and a sprocket between the first end and the second end. The roller also includes a plurality of paddles arranged widthwise from the first end to the second end. The plurality of paddles are coupled to the sprocket and located circumferentially around the sprocket. Each paddle of the plurality of paddles includes a tip edge extending radially outward to extend into openings of the conveyor belt, and an opening extending therethrough. The roller further includes a retaining ring routed through the openings of the plurality of paddles to prevent radially outward movement of the plurality of paddles.

DESCRIPTION OF THE DRAWINGS

The following drawings are provided to help illustrate various features of non-limiting examples of the disclosure, and are not intended to limit the scope of the disclosure or exclude alternative implementations.

DETAILED DESCRIPTION

Figure 1:
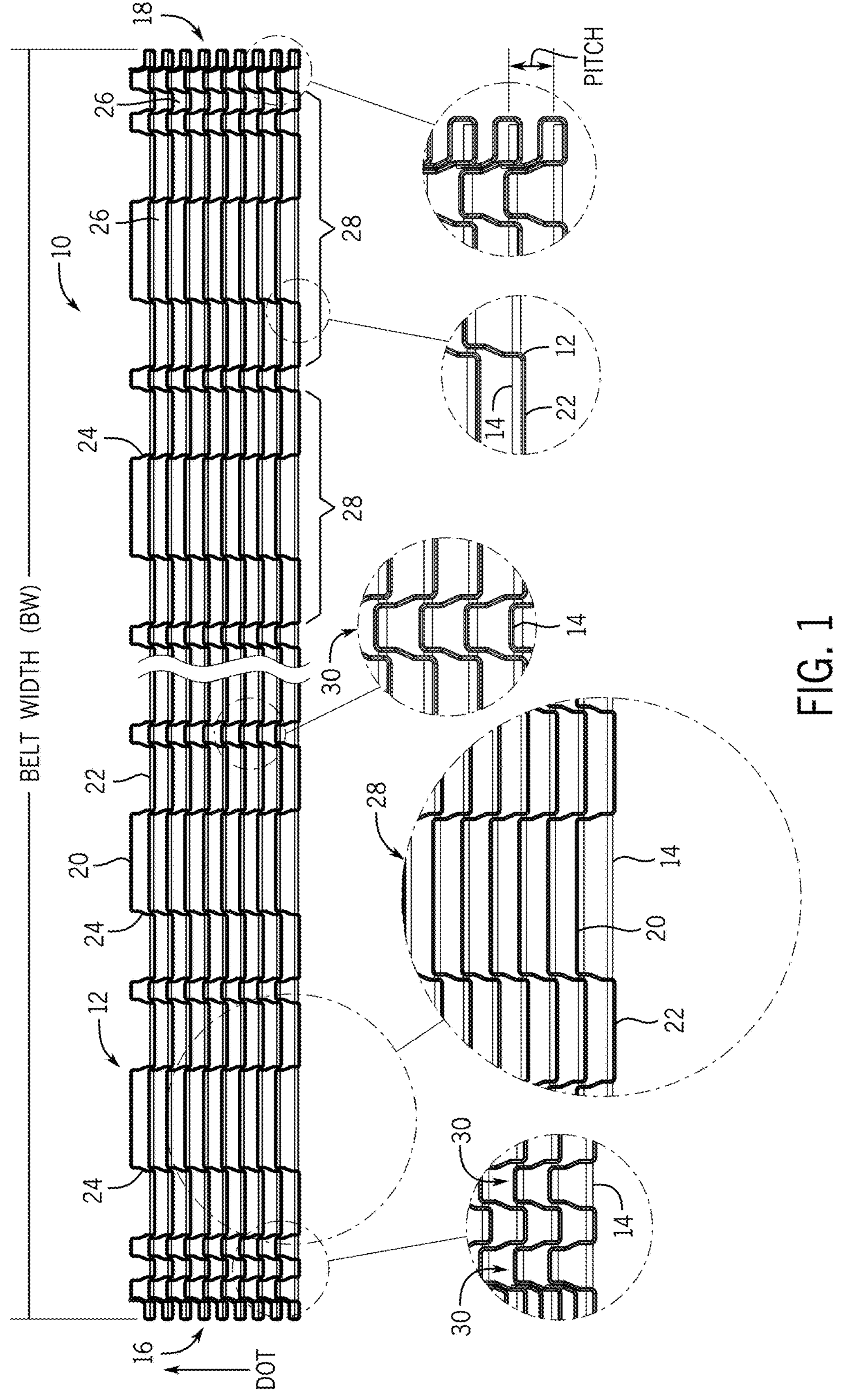
FIG. 1 is a top-down view of a conveyor belt for use with some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Given the benefit of this disclosure, skilled artisans will recognize the examples provided herein have many useful alternatives and fall within the scope of embodiments of the invention.

FIG. 1 illustrates an example conveyor belt 10 that can be used in, for example, food processing applications. As shown in FIG. 1, the conveyor belt 10 includes a plurality of pickets 12 intertwined by widthwise rods 14. The conveyor belt 10 extends a belt width (BW) between a first end 16 and a second end 18. Each picket 12 is shaped to include a number of forward extensions 20 and a number of rearward extensions 22, the terms "forward" and "rearward" being in relation to, e.g., a direction of travel (DOT) of the conveyor belt 10. Transitions 24 between the forward extensions 20 and rearward extensions 22 include first through-holes (not shown) adjacent the forward extensions 20 and second through-holes (not shown) adjacent the rearward extensions 22, each sized to permit the rods 14 to extend therethrough. As a result, a rod 14 will extend through first through-holes of a first picket 12 and second through-holes of a second, adjacent picket 12 to create this intertwining engagement between pickets 12.

As shown in FIG. 1, this engagement creates pitches or openings 26 throughout the conveyor belt 10. That is, an opening 26 can be defined between a transition 24, a forward extension 20, another transition 24, and an adjacent forward extension 20; and another opening 26 can be defined between a transition 24, a rearward extension 22, another transition 24, and an adjacent rearward extension 22. Each opening 26 of the example conveyor belt 10 has a respective rod 14 extending therethrough. Furthermore, each through-hole of the pickets 12 can be elongated through-holes to allow a predetermined amount of translation of each rod 14 extending therethrough. In this manner, the pickets 12 can translate and/or rotate relative to one another (causing the openings 26 to expand or contract), for example, to allow for rotation of the belt 10 around a sprocket (not shown in FIG. 1).

A width and amount of forward and rearward extensions 20, 22, and resulting pitch size, can be customized for a particular application, such as for the size and/or type of products and materials used in the application. For example, the conveyor belt 10 of FIG. 1 illustrates a repeating "triple infill" pattern 28 of a rearward extension 22, a forward extension 20, and another rearward extension 22. Furthermore, these patterns 28 can be separated by sprocket lanes 30. For example, each sprocket lane 30 can comprise a single, relatively short, forward extension 20 sized to receive teeth of a sprocket wheel (not shown in FIG. 1) for driving the conveyor belt 10. As shown in FIG. 1, one or more sprocket lanes 30 can also be located adjacent the first end 16 and the second end 18.

The conveyor belt 10 can be used for, and customized for, a number of applications, including food processing applications involving, but not limited to, breading, battering, frying, among others. In certain food processing applications, such as those involving breading or battering, the openings 26 in the belt 10 may become packed with breading or battering materials, which is considered belt "pack-out." As a result, unwanted material may be carried over during subsequent belt revolutions and/or sprockets may not be able to engage the belt 10 properly for proper belt movement, causing the belt 10 to shift or lift off track and/or the conveyor driver motor to stall, and all of these issues may require service downtime for maintenance. To address belt pack-out, clean-out rollers have been developed to help dislodge the material buildup from the belt as the belt rolls over the clean-out roller. Such current solutions, however, have limitations that prevent them from being an affordable, cost-efficient, customizable, robust, and/or long-term solution. In light of the this, some embodiments provide a clean-out roller for use with conveyor belts, such as the conveyor belt 10 described above or other types of conveyor belts not specifically described herein.

Figure 2:
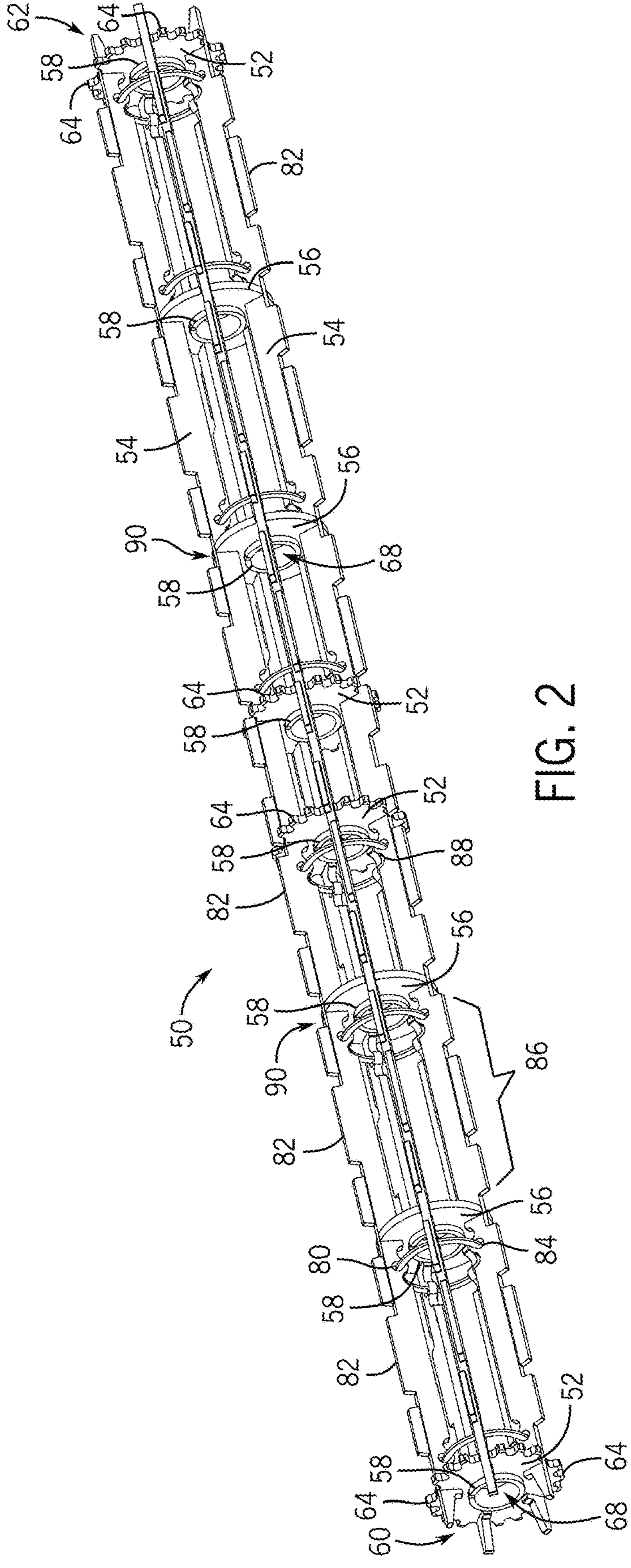
FIG. 2 is an isometric view of a clean-out roller according to some embodiments.
Figure 8:
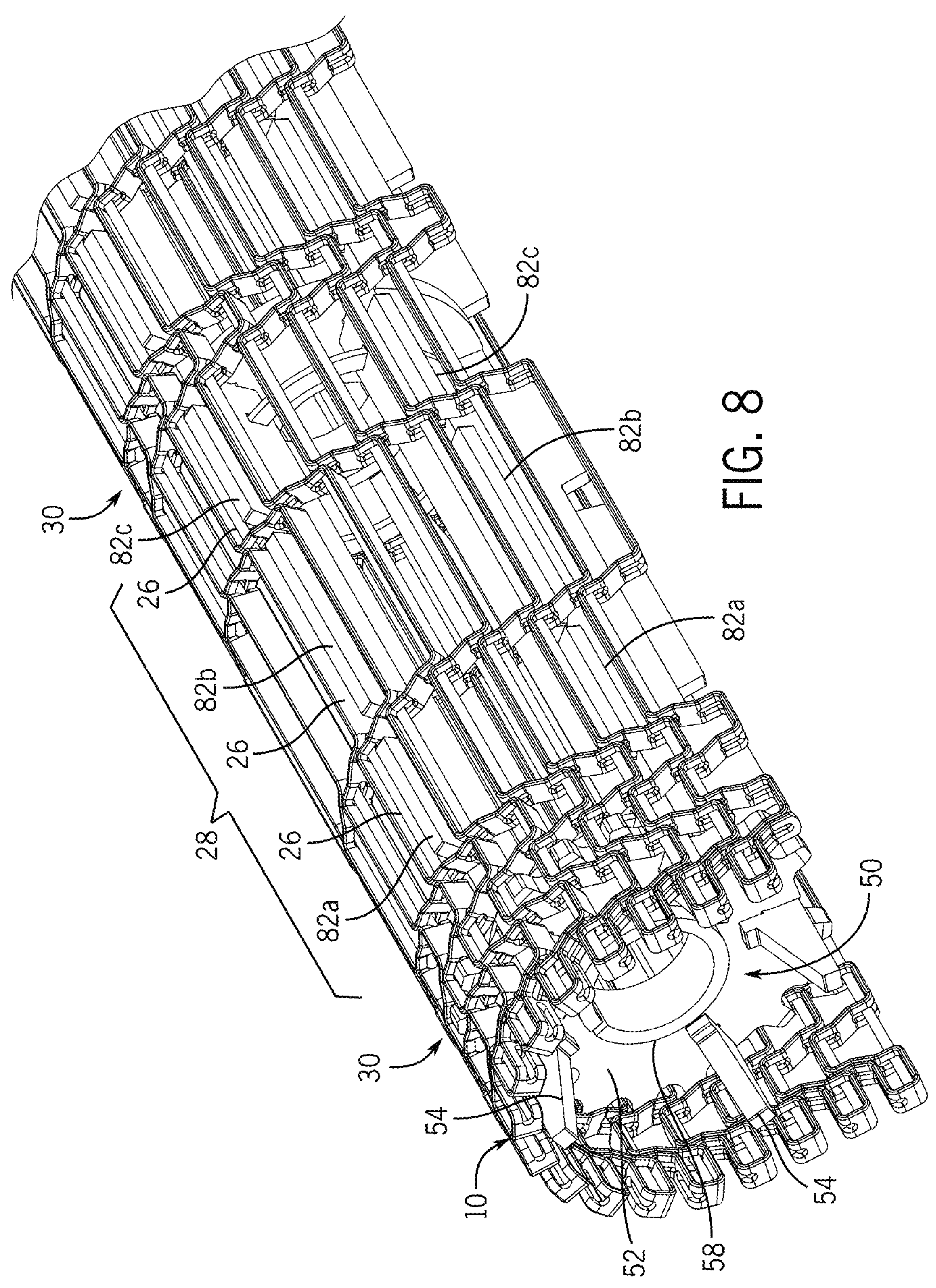
FIG. 8 is a partial isometric view of the clean-out roller of FIG. 3 engaged with a portion of a conveyor belt.

Referring now to FIGS. 2-8, a clean-out roller 50 according to some embodiments is illustrated. FIG. 8 illustrates the roller 50 engaged with a conveyor belt 10, which may be the same type of conveyor belt 10 as that shown and described above with respect to FIG. 1. Referring now to the roller 50 of some embodiments, as shown in FIG. 2, the roller 50 can include a plurality of sprockets 52, a plurality of paddles 54, a plurality of discs 56, and a plurality of bushings 58. The roller 50 can include a first end 60 and a second end 62, e.g., corresponding with the first end 16 and the second end 18, respectively, of a conveyor belt 10. Generally, the sprockets 52 can include at least a first sprocket 52 adjacent the first end 60 and a second sprocket 52 adjacent the second end 62, as well as one or more central or intermediate sprockets 52. The discs 56 can be located between sprockets 52. The paddles 54 can extend along a width of the roller 50 from the first end 60 to the second end 62 and be coupled to the sprockets 52 and the discs 56 circumferentially around the sprockets 52 and the discs 56. The paddles 54 can include tip edges 82 extending radially outwardly to extend into openings 26 of the conveyor belt 10, as shown in FIG. 8. In some applications, the sprockets 52, the paddles 54, and the discs 56 may all be made of metal, such as stainless steel. As such, these components that may be laser-cut. However, in other applications, these components may be made of different materials. Furthermore, in some applications, the bushings 58 may be made of plastic or another suitable material.

With further reference to the sprockets 52, as best shown in FIGS. 2-5, the sprockets 52 can include at least a first sprocket 52 adjacent the first end 60 and a second sprocket 52 adjacent the second end 62, as well as one or more central sprockets 52. For example, FIGS. 2-8 illustrate the roller 50 with two central sprockets 52 spaced apart between the first sprocket 52 along the first end 60 and the second sprocket 52 along the second end 62. Generally, a maximum number of sprockets 52 and locations of sprockets 52 can be dictated by the number of sprocket lanes 30 in the corresponding conveyor belt 10, though not all sprocket lanes 30 in a conveyor belt 10 may receive a respective sprocket 52. More specifically, as shown, each sprocket 52 can include a plurality of teeth 64 extending radially outward from an outer circumferential surface of the sprocket 52, and the teeth 64 are configured to extend into an opening 26 of the conveyor belt 10, e.g., along the sprocket lane 30 illustrated in FIGS. 1 and 8. As a result, rotation of the sprocket 52 (e.g., by a gear shaft, not shown) can drive movement of the conveyor belt 10. Thus, the sprockets 52 can be positioned adjacent ends 60, 62 and a middle portion of the roller 50 to provide proper and adequate tracking between the belt 10 and the roller 50. Additionally, in some applications, the total number of teeth 64 can be an odd number, as discussed in more detail below.

Figure 3:
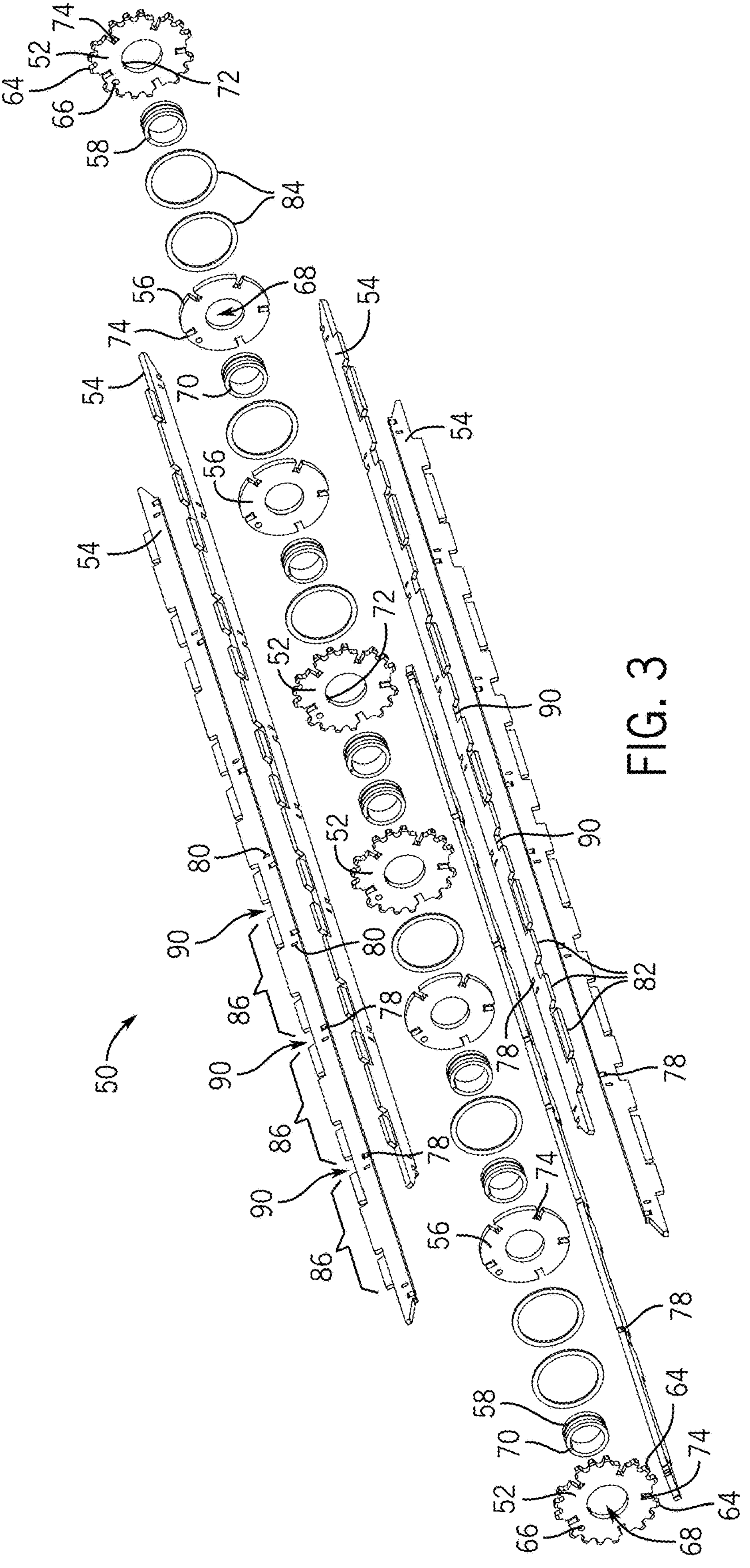
FIG. 3 is an isometric exploded view of a clean-out roller according to some embodiments.
Figures 5, 6, 7:
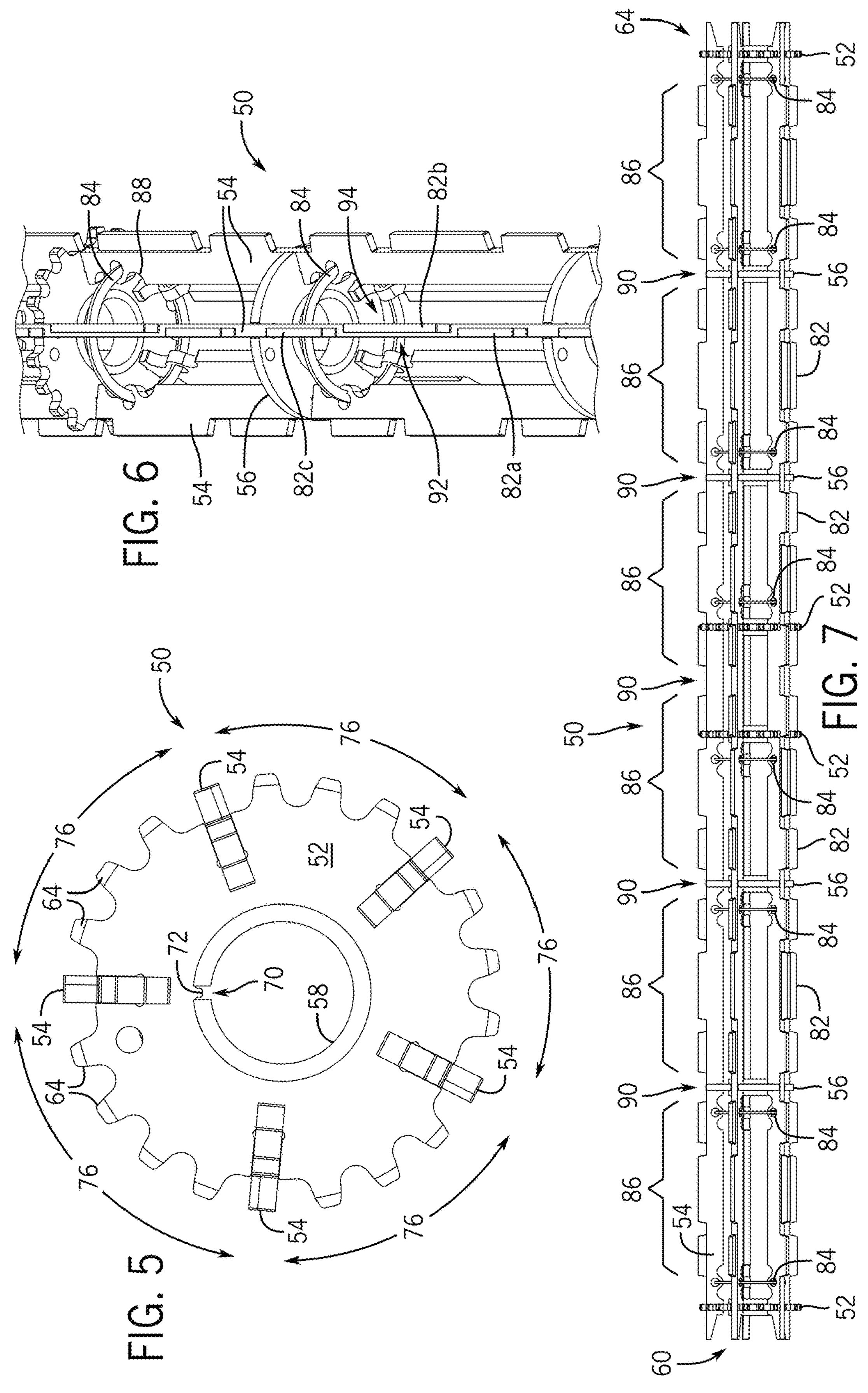
FIG. 5 is a side view of the clean-out roller of FIG. 2.
FIG. 6 is a partial top isometric view of the clean-out roller of FIG. 2.
FIG. 7 is a front view of the clean-out roller of FIG. 2.

As best shown in FIG. 3, each sprocket 52 can include a circular center opening 68, for example, to receive a shaft therethrough (not shown). The center opening 68 can further receive a bushing 58 that helps the sprocket 52 freely rotate about the shaft, which may be fixed, when the sprocket 52 is driven. As best shown in FIGS. 3 and 5, the bushing 58 can be a split bushing, i.e., including a cutout 70. Furthermore, the center opening 68 can include a radially inwardly extending projection 72 that extends into the cutout 70, thus preventing the split bushing 58 from rotating relative to the center opening 68 of the sprocket 52.

Referring still to FIG. 3, each sprocket 52 can include a plurality of spaced-apart notches 74 formed radially inward from an outer circumferential surface at discrete circumferential positions about the sprocket 52. Each of the notches 74 can receive a paddle 54 to engage and index the paddle 54 with the sprocket 52. As best shown in FIG. 5, the notches 74 can be circumferentially spaced around the sprocket 52 in an unequal spacing pattern about the sprocket 52 so that the paddles 54, in turn, are also circumferentially spaced around the sprocket 52 in an unequal spacing pattern about the sprocket 52. Furthermore, generally, a total number of teeth 64 around the sprocket 52 can be greater than a total number of paddles 54. For example, using the design illustrated in FIGS. 2-8, the roller 50 can include five paddles 54 and the sprocket 52 can include twenty-one teeth 64. The paddles 54 can be spaced circumferentially around the sprocket 52 in an unequal spacing pattern, such as a 4-4-4-4-5 pattern. That is, with reference to FIG. 5, there are five arcs 76 between the five paddles 54. Four of the arcs 76 are spaced by a distance of four openings (corresponding to three teeth 64 located along the respective arc 76) and a fifth arc 76 is spaced by a distance of five openings (corresponding to four teeth 64 located along the fifth arc 76). As a result, while the teeth 64 can engage each adjacent opening 26 along the conveyor belt 10 to drive the conveyor belt, the paddles 54 engage openings 26 that are spaced apart lengthwise.

As noted above, the total number of teeth around the sprocket 52 can be odd. This odd numbering, in combination with the unevenly spaced paddles 54 causes paddle engagement with the conveyor belt 10 to vary in a way such that it takes more belt revolutions (i.e., more times that a particular point along the belt reaches the roller 50) for the engagement pattern (e.g., particular pattern of openings 26 engaged by the roller 50) to repeat. By way of example, using the design illustrated in FIGS. 2-8 with five paddles 54 per roller revolution and twenty-one teeth 64 per roller revolution, with a 4-4-4-4-5 paddle spacing pattern, a conveyor belt 10 comprising 28 belt pitches (openings 26) per foot would result in 1.333 roller revolutions per foot of belt 10 (28 pitches divided by 21 teeth) and 6.67 paddles engaging per foot of belt (5 paddles times 1.333 revolutions per foot of belt). With 6.67 paddles 54 engaging per foot of belt, at a minimum, 4.2 revolutions of the belt 10 are required for complete engagement on a per foot basis (28 pitches divided by 6.67), that is, for the paddles 54 to engage each opening 26 along the belt 10. Because of the odd/even variation in the paddle spacing, the actual required belt revolutions on a per foot basis may be two times this quantity, that is, 8.4 belt revolutions. However, if the belt 10 has an odd number of pitches, then the actual required belt revolutions is approximately 1.5 times the above amount, that is, 12-13 belt revolutions. Accordingly, the roller 50 will generally engage all belt pitches 26 within 8-13 overall belt revolutions, depending on the belt length (pitch count).

It should be noted that this design is but one example and the variables discussed herein (e.g., paddles/roller revolution, belt pitches per foot, and teeth per roller) can be strategically designed to ensure the desired paddle-pitch engagement that cleans out each pitch in an efficient/minimum number of belt revolutions. Accordingly, the roller 50 can include a minimal number of paddles 54 (here, five paddles compared to twenty-one teeth 64 around the sprocket 52) to provide a substantially "open" design. This open design can still engage all belt pitches 26 but also help prevent the roller 50 itself from being clogged with product or material that falls through the openings 26, as may occur with a closed design comprising paddles engaging each subsequent pitch or paddles extending from a cylinder extending the width of the roller.

Referring now to the discs 56, as best shown in FIGS. 2-4 and 6, each disc 56 can include a substantially smooth outer circumferential surface, for example, compared to the toothed outer circumference of the sprockets 52. Generally, the discs 56 can be arranged along a width of the roller 50 between select sprockets 52. In the design illustrated in FIGS. 2-8, the roller 50 can include four discs: first and second discs 56 between the sprocket 52 along the first end 60 and one of the central sprockets 52, and third and fourth discs 56 between the sprocket 52 along the second end 62 and the other one of the central sprockets 52. However, more or fewer discs 56 may be contemplated in some designs.

The discs 56 can provide additional support for the paddles 54 along the width of the roller 50. Accordingly, as shown in FIG. 3, each disc 56 can include a plurality of spaced-apart notches 74 formed radially inward from the outer circumferential surface at discrete circumferential positions about the disc 56. Each of the notches 74 in the disc 56 can align with notches 74 along the sprockets 52 and can, thus, receive a respective paddle 54 to engage the paddle 54 with the disc 56. Furthermore, as shown in FIG. 3, each disc 56 can include a circular center opening 68, for example, to receive a shaft therethrough (not shown). The center opening 68 can further receive a bushing 58 that helps the disc 56 freely rotate about a fixed shaft. As shown in FIG. 3 and discussed above, the bushing 58 can be a split bushing, i.e., including a cutout 70. Furthermore, the center opening 68 can include a radially inwardly extending projection 72 that extends into the cutout 70, thus preventing the split bushing 58 from rotating relative to the center opening 68. The discs 56 and the sprockets 52 can each also include a pinhole 66, as shown for example in FIG. 3, to aid alignment and assembly of the roller 50.

Referring now to the paddles 54, as shown in FIGS. 2-4 and 6-8, each paddle 54 can extend a full width of the roller 50, from the first end 60 to the second end 62, and can include notches 78, optional ring holes 80, and tip edges 82. As best shown in FIG. 3, the notches 78 can be formed to extend from an inner surface thereof and can align with the notches 74 of the sprockets 52 and the discs 56. Accordingly, the paddles 54 can be coupled to the sprockets 52 and the discs 56 through engagement at the respective notches 74, 78. In some applications, this engagement can be welded, adhered, or otherwise joined to secure the paddles 54 to the sprockets 52 and the discs 56.

Additionally or alternatively to the welded coupling, the roller 50 can include a plurality of retaining rings 84 to help maintain the engagement between the paddles 54 and the sprockets 52 and the discs 56 at the notches 74, 78. Thus, the roller 50 may be assembled with or without welding operations. More specifically, as shown in FIGS. 2, 4, 5, and 8, each retaining ring 84 can be a split ring or circle cotter that can be routed through aligned ring holes 80 of all paddles 54 around the roller 50 after the paddles 54 and the sprockets 52 and the discs 56 are engaged at the respective notches 74, 78. In this manner, the retaining ring 84 can urge the paddles 54 radially inward, substantially preventing radially outward movement of the paddles 54 and keeping them from disengaging from the notches 74. As shown in FIG. 3, each paddle 54 can include a ring hole 80 adjacent each notch 78. However, in some applications, more or fewer ring holes 80 may be placed at different locations along the width of the paddle 54. Furthermore, in some designs, as shown in in FIGS. 2, 4, and 6, the paddles 54 can include additional notches 88 extending outward from an inner surface and adjacent to the ring holes 80 to provide clearance to allow for the retaining rings 84 to be threaded through the ring holes 80.

As shown in FIGS. 2-4 and 6-8 and as noted above, each paddle 54 can include one or more tip edges 82 that extend radially outward across a width of the paddle 54. The tip edges 82 can extend into, or engage, openings 26 of the conveyor belt 10 in order to prevent materials from building up in the belt 10 during operation. For example, in some applications, a radial length of all tip edges 82 is equal across a width of the paddle 54.

Figure 4:
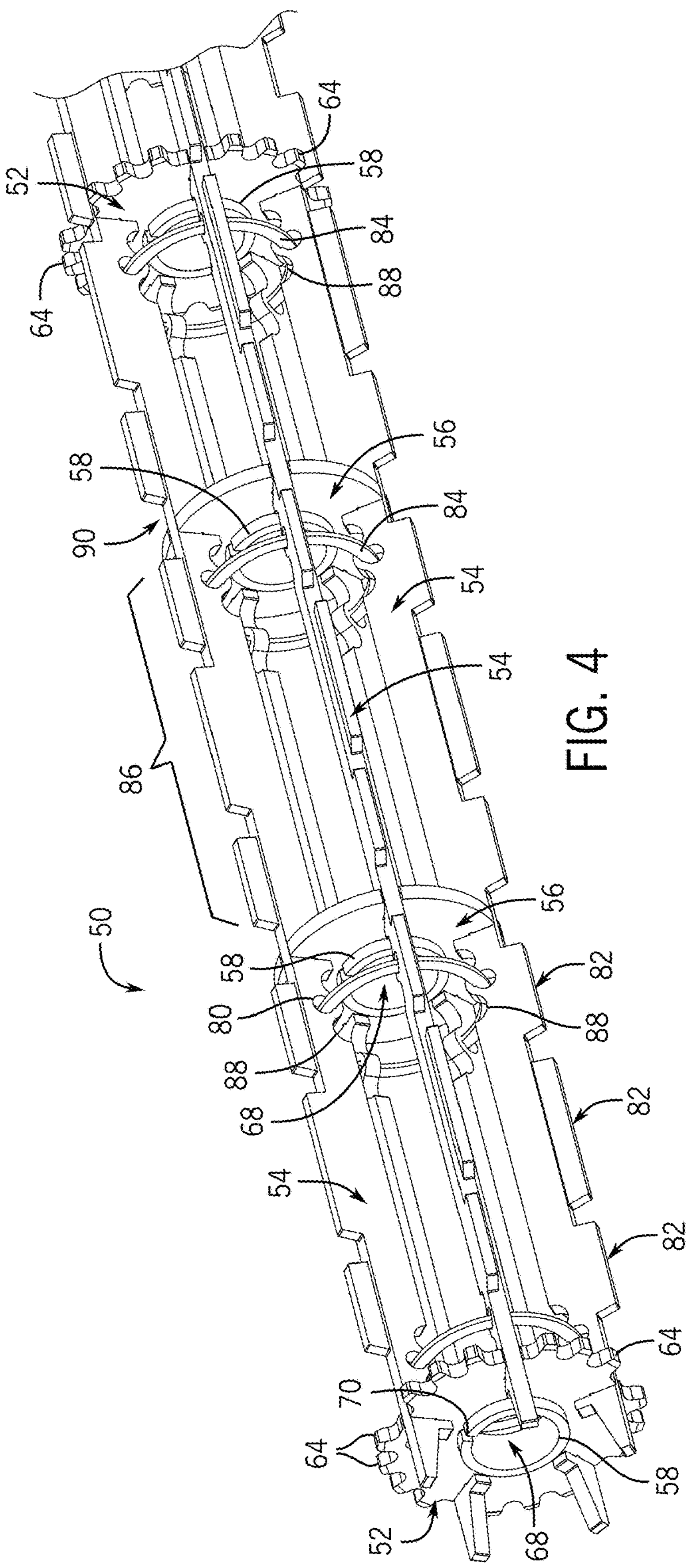
FIG. 4 is a partial isometric view of the clean-out roller of FIG. 2.

Generally, the tip edges 82 can be sized and shaped, e.g., in terms of radial length, width, and/or thickness, to correspond to the opening patterns along the conveyor belt 10. For example, as described above, the conveyor belt 10 illustrated in FIGS. 1 and 8 includes a triple infill pattern 28 of a rearward extension 22, a forward extension 20, and another rearward extension 22 creating openings 26. Accordingly, each paddle 54 can include a repeating triple tip pattern 86 of three adjacent tip edges 82, separated by a larger space 90. However, as noted above, other patterns of openings 26, and corresponding tip edges 82, may be contemplated. As shown in FIGS. 2, 4, and 7, the discs 56 can be located adjacent to spaces 90 between the triple tip patterns 86. Furthermore, in some designs, an additional protrusion or tip edge (not shown) may be positioned within the space 90 between the central sprockets 52 (e.g., to further engage into openings 26 of the conveyor belt 10).

With reference to FIGS. 2-4 and 6, each triple tip pattern 86 includes a first tip edge 82, a second tip edge 82, and a third tip edge 82 axially adjacent one another, with clearances provided to accommodate structures of the belt 10. Furthermore, the first tip edge 82 and the second tip edge 82 can be circumferentially offset from one another; and the second tip edge 82 and the third tip edge 82 can be circumferentially offset from one another. In this manner, the tip edges 82 can better align with the offset openings 26 of the belt 10 created by the engaged pickets 12 with alternating extensions 20, 22, as shown in FIG. 8.

In some applications, to accomplish this circumferentially offset pattern, with reference to FIG. 6, a first tip edge 82*a* is flush with a first side 92 of the paddle 54 and offset from a second side 94 of the paddle 54, and a second tip edge 82*b* is flush with the second side 94 of the paddle 54 and offset from the first side 92 of the paddle 54. Furthermore, a third tip edge 82*c* is flush with the first side 92 of the paddle 54 and offset from the second side 94 of the paddle 54. In other applications, however, the tip edges 82 need not be flush with a side of the paddle 54, though may still be circumferentially offset from one another. In addition, while the example embodiment includes tip edges of a particular construction, the form factor of the tip edges can be adapted to accommodate application-specific features. For instance, the tip edges may be more tapered or rounded toward or at a distal tip, or define a form factor that closely meshes with or conforms to the belt openings into which each is engaged.

Given the benefit of this disclosure, it will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. A roller that interfaces with a conveyor belt, the roller comprising:

a first sprocket adjacent a first end;

a second sprocket adjacent a second end; and a plurality of paddles arranged widthwise from the first end to the second end, the plurality of paddles coupled to the first sprocket and the second sprocket and located circumferentially around the first sprocket and the second sprocket in an unequal spacing pattern about the first sprocket and the second sprocket, a paddle of the plurality of paddles including a tip edge extending radially outward to extend into openings of the conveyor belt;

wherein the roller further comprising a disc arranged between the first sprocket and the second sprocket and coupled to the plurality of paddles;

wherein the first sprocket, the second sprocket, and the disc each include a plurality of notches extending inward from an outer circumferential surface, each of the plurality of notches to receive one of the plurality of paddles.

2. The roller of claim 1, wherein the first sprocket and the second sprocket each have a plurality of teeth extending radially outward from an outer circumferential surface of the respective sprocket, each of the plurality of teeth configured to extend into an opening of the conveyor belt.

3. The roller of claim 2, wherein a total number of the plurality of teeth is greater than a total number of the plurality of paddles.

4. The roller of claim 3, wherein the total number of the plurality of teeth is an odd number.

5. The roller of claim 1, wherein the disc has a substantially smooth outer circumferential surface.

6. The roller of claim 5, wherein the tip edge includes a first tip edge and a second tip edge arranged axially adjacent one another and circumferentially offset from one another.

7. The roller of claim 6, wherein the first tip edge is flush with a first side of the paddle and offset from a second side of the paddle, and the second tip edge is flush with the second side of the paddle and offset from the first side of the paddle.

8. The roller of claim 1, wherein the first sprocket, the second sprocket, and the disc each include circular center opening; and further comprising a bushing arranged about the circular center opening.

9. The roller of claim 8, wherein the bushing is a split bushing; and each center opening include a radially inwardly extending projection that engages the split bushing to prevent the split bushing from rotating about the center opening.

10. The roller of claim 5, further comprising a central sprocket located between the first sprocket and the second sprocket.

11. The roller of claim 10, wherein the disc includes a first disc and a second disc located between the first sprocket and the central sprocket, and a third disc and a fourth disc located between the central sprocket and the second sprocket.

12. The roller of claim 1, wherein each of the plurality of paddles includes an opening extending therethrough; and further comprising a retaining ring extending through the openings to prevent radially outward movement of the plurality of paddles.

13. The roller of claim 1, wherein a radial length of the tip edge is equal across a width of the paddle.

14. The roller of claim 1, wherein the plurality of paddles are welded to the first sprocket and the second sprocket.

15. A roller that interfaces with a conveyor belt, the roller comprising:

a first end;

a second end;

a sprocket between the first end and the second end; and a plurality of paddles arranged widthwise from the first end to the second end, the plurality of paddles coupled to the sprocket and located circumferentially around the sprocket, a paddle of the plurality of paddles including a tip edge extending radially outward to extend into openings of the conveyor belt, wherein the tip edge includes a first tip edge and a second tip edge arranged axially adjacent one another and circumferentially offset from one another.

16. The roller of claim 15, wherein the first tip edge is flush with a first side of the paddle and offset from a second side of the paddle, and the second tip edge is flush with the second side of the paddle and offset from the first side of the paddle.

17. A roller that interfaces with a conveyor belt, the roller comprising:

a first end;

a second end;

a sprocket between the first end and the second end;

a plurality of paddles arranged widthwise from the first end to the second end, the plurality of paddles coupled to the sprocket and located circumferentially around the sprocket, each paddle of the plurality of paddles comprising:

a tip edge extending radially outward to extend into openings of the conveyor belt, and an opening extending therethrough; and a retaining ring routed through the openings of the plurality of paddles to prevent radially outward movement of the plurality of paddles.

18. The roller of claim 17, wherein the retaining ring is a split ring.

* * * * *